Patented Feb. 3, 1942

2,271,708

UNITED STATES PATENT OFFICE 2,271,708

PROCESS OF PRODUCING HIGH-MOLECULAR OXYGEN-CONTAINING COMPOUNDS

Max Neber, Ludwigshafen-on-the-Rhine, Germany, assignor, by mesne assignments, to General Aniline & Film Corporation, New York, N. Y., a corporation of Delaware No Drawing. Application July 20, 1939, Serial No. 285,552. In Germany July 22, 1938

3 Claims. (Cl. 260—594)

The present invention relates to a process of producing high-molecular compounds containing oxygen from aldehydes or ketones.

I have found that high-molecular oxygen-containing compounds which are very valuable industrially are obtained by causing alkali metals to act on aliphatic, cycloaliphatic, aliphatic-cycloaliphatic or aliphatic-aromatic aldehydes having at least 7 carbon atoms in the molecule or ketones of the same molecular range containing adjacent to the carbonyl group methyl or methylene groups.

Suitable initial materials of the aliphatic series are for example ethyl-hexylaldehyde, oenanthic aldehyde, octyl, lauryl or stearic aldehyde, dibutyl ketone, dipentyl ketone, dihexyl ketone, diheptyl ketone, dioctyl ketone or dinonyl ketone, diheptadecyl ketone, butyl hexyl ketone or methyl undecyl ketone. The said ketones are obtained by ketonization of fatty acids or mixtures of the same, as for example by heating the acids in the presence of catalysts, such as iron powder; they may contain straight or branched chains.

Mixtures of ketones, which are obtainable for example by ketonization of acid mixtures occurring naturally or prepared synthetically, as for example from saponification products of oils or fats or from carboxylic acid mixtures of the oxidation of high-molecular paraffinic hydrocarbons, such as paraffin wax, mineral oils or paraffin wax obtained by the catalytic reduction of carbon oxides, are especially suitable as initial materials. There may also be mentioned as particularly suitable the ketones obtainable from acid mixtures which are obtained as the so-called "first runnings" when distilling carboxylic acid mixtures produced by the oxidation of paraffin wax and which consist for example of acids having a carbon atom number of from 4 to 11.

Suitable cycloaliphatic, aliphatic-cycloaliphatic and aliphatic-aromatic aldehydes and ketones are for example hexahydrobenzaldehyde, ethyl cyclohexylaldehyde, para-tolyl-aldehyde or cinnamic aldehyde, dimethyl cyclohexanone, methyl or hexyl cyclohexyl ketone, acetophenone, octyl phenyl ketone, undecyl phenyl ketone or pentadecyl phenyl.

The said aldehydes and ketones are reacted with the alkali metals at ordinary temperature or also, in particular when using high-molecular weight aldehydes or ketones, at elevated temperature, as for example at temperatures between 30° and 250° C. It is advantageous to use the alkali metal in an amount corresponding to at least about 1 atomic proportion of metal for 1 molecular proportion of the carbonyl compound. In certain cases it is preferable to use 2 or more atomic proportions of metal to 1 molecular proportion of carbonyl compound. The alkali metals may also be used in the form of amalgams for instance as sodium amalgam or potassium amalgam.

It is advantageous to carry out the reaction with the use of indifferent solvents, such as ether, benzine, benzene or decahydronaphthalene. Contrary to expectation there is scarcely any resinification when employing aldehydes as initial substance, even under energetic reaction conditions. There are usually obtained pasty to solid wax-like masses. By decomposition of these masses with water or dilute acids, as for example hydrochloric or sulfuric acid, products are obtained which differ from the carbonyl compounds used as initial materials by their possessing a hydroxyl number. These decomposition products contain besides hydroxyl presumably ethereal substances. They may be subjected to fractional distillation.

It is probable that the action of the alkali metal leads to at least a partial preliminary formation of an enolate. Of necessity, therefore, hydrogen must be set free; however, this hydrogen does not appear, but asserts an immediate reducing effect upon other molecules of the reaction mixture. At the same time, there takes place a condensation between the enolate and one other molecule of the carbonyl compound, very likely in the manner of an aldol condensation, similarly to the formation of acetone alcohol and its sodium derivative respectively from acetone.

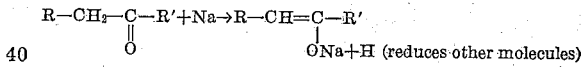

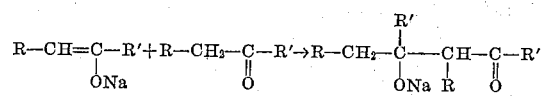

R and R' stand for hydrogen or a methyl or any other suitable group. However, the reaction is not terminated with the above formulated products, but it appears that ring closures follow in which the oxygen is converted into ether-like linkages for the reason that the oxygen while still present in the final high-boiling products cannot be detected, or at least only to a very minor extent, by ketone or hydroxyl group reactions.

The products obtained may be used as additions to polishes, agents for polishing leather or coating compositions. The higher-boiling, more highly viscous products are especially suitable as lubricating and softening agents, wool greases or the like.

The following examples will further illustrate the nature of this invention but the invention is not restricted to these examples. The parts are by weight.

Example 1

400 parts of a ketone mixture (obtained by ketonization of first runnings of fatty acids produced by the oxidation of paraffin wax (fatty acids having from 7 to 9 carbon atoms in the molecule)) have added thereto 40 parts of metallic sodium in small batches while stirring well at 150° C., the whole being stirred at the same temperature until the sodium has completely dissolved. A yellow paste is obtained which yields an oily product and an aqueous liquor upon the addition of water.

The oily product is subjected to fractional distillation in vacuo. Under a pressure of 7 millimeters (mercury gauge) there thus distils over up to 230° C. a colorless product having the following characteristics:

Carbonyl number _____ 90
Hydroxyl number _____ 110

By further distillation there passes over between 230° and 280° C. a fraction having a carbonyl number of 20 and a hydroxyl number of 30.

Example 2

80 parts of a ketone mixture (obtainable by leading the vapors of first runnings of fatty acids produced by the oxidation of paraffin wax and having from 5 to 6 carbon atoms in the molecule at from 350° to 400° C. over a manganous oxide catalyst) are dissolved in an equal amount of ether and, after the addition of 12 parts of pulverulent sodium, heated to boiling under reflux for several hours while stirring. After distilling off the ether there is obtained a pasty product which by treatment with dilute hydrochloric acid yields a salt solution and an oily product. By fractional distillation of the oily product, two fractions can be obtained therefrom; the first fraction boils up to 210° C. under a pressure of 7 millimeters and has a carbonyl number of 130 and a hydroxyl number of 130. The second fraction distils between 210 and 250° C. under a pressure of 7 millimeters and has a carbonyl number of 30 and a hydroxyl number of 60.

Example 3

400 parts of the ketone obtained by ketonization of caprylic acid are treated at 150° C. with 80 parts of metallic sodium while stirring strongly until the sodium has all dissolved. A wax-like product is obtained which after treatment with water has a carbonyl number of 30 and a hydroxyl number of 150 and which may be split up by vacuum distillation into a low-boiling product (having a carbonyl number of 25 and a hydroxyl number of 200) and a higher-boiling oily product (having a carbonyl number of 40 and a hydroxyl number of 0).

Example 4

30 parts of metallic sodium are added at room temperature to 180 parts of ethyl hexyl aldehyde in anhydrous ether. When the spontaneous reaction subsides, the whole is heated under reflux until the sodium has entirely disappeared. After treatment with water, a product soluble in ether is obtained which has a carbonyl number of 20 and a hydroxyl number of 280 and there is also obtained a water-soluble, strongly alkaline, foaming paste.

The compounds obtained according to the process described above may be converted into the water-soluble state by treating them with sulfonating agents such as sulfuric acid or chlorsulfonic acid or with phosphoric acid, furthermore by condensing with halogen-containing organic acids, such as chloracetic acid or chlorethane sulfonic acid. The conversion of the said high-molecular oxygen-containing compounds can also be effected by the interaction of alkylene oxides, particularly ethylene oxide or by introducing hydroxy polyalkylene ether radicals.

What I claim is:

1. The process of producing high-molecular oxygen-containing compounds, which comprises causing alkali metals to act at a temperature between 30° and 250° C. on a mixture of ketones formed by ketonizing a mixture of higher molecular fatty acids obtained by the oxidation of high-molecular aliphatic hydrocarbons and decomposing the alkali metal compounds obtained with water.

2. High-molecular oxygen-containing compounds obtained by causing alkali metals to act at a temperature between 30° and 250° C. on an aliphatic ketone containing at least 7 carbon atoms in the molecule and in the adjacent positions only group selected from the class consisting of methyl and ethylene groups and decomposing the alkali metal compounds obtained with water.

3. High-molecular oxygen-containing compounds obtained by causing alkali metals to act at a temperature between 30° and 250° C. on a mixture of ketones formed by ketonizing a mixture of higher molecular fatty acids obtained by the oxidation of high-molecular aliphatic hydrocarbons and decomposing the alkali metal compounds obtained with water.

MAX NEBER.